United States Patent [19]

Scharlack

[11] 4,086,466
[45] Apr. 25, 1978

[54] AUTOMATIC HEATER CONTROLLER

[76] Inventor: Ronald S. Scharlack, 121 Colbourne Crescent, Brookline, Mass. 02146

[21] Appl. No.: 682,128

[22] Filed: Apr. 30, 1976

[51] Int. Cl.² .......................................... H05B 1/02
[52] U.S. Cl. .................................. 219/494; 219/501
[58] Field of Search ............... 219/494, 497, 499, 501, 219/504, 505

[56] References Cited

U.S. PATENT DOCUMENTS

| | | | |
|---|---|---|---|
| 2,866,067 | 12/1958 | Dolan et al. | 219/499 |
| 2,918,558 | 12/1959 | Evans | 219/499 |
| 3,215,818 | 11/1965 | Deaton | 219/499 |
| 3,597,590 | 8/1971 | Fleming | 219/501 |
| 3,646,577 | 2/1972 | Ernst | 219/501 X |
| 3,651,753 | 3/1972 | Schmidt | 219/501 |
| 3,684,454 | 8/1972 | Martin et al. | 219/505 |
| 3,869,597 | 3/1975 | Strange | 219/505 |

*Primary Examiner*—J. V. Truhe
*Assistant Examiner*—Fred E. Bell
*Attorney, Agent, or Firm*—Robert F. O'Connell

[57] ABSTRACT

A system for controlling the temperature of the heater element of a heating apparatus by controlling the resistance of the heater element. In a preferred embodiment, the control system monitors a sensing excitation voltage at the heater element for comparison with a reference voltage, preferably at or near the zero-crossings of the heater power source cycle, and thereupon operates so that power to the heater element is always applied and terminated at zero-crossings of power cycle. In a preferred embodiment, the controller is arranged to permit only integral cycles of power to be applied to the heater element to avoid a DC bias buildup and undesirable loading of the power line.

28 Claims, 15 Drawing Figures

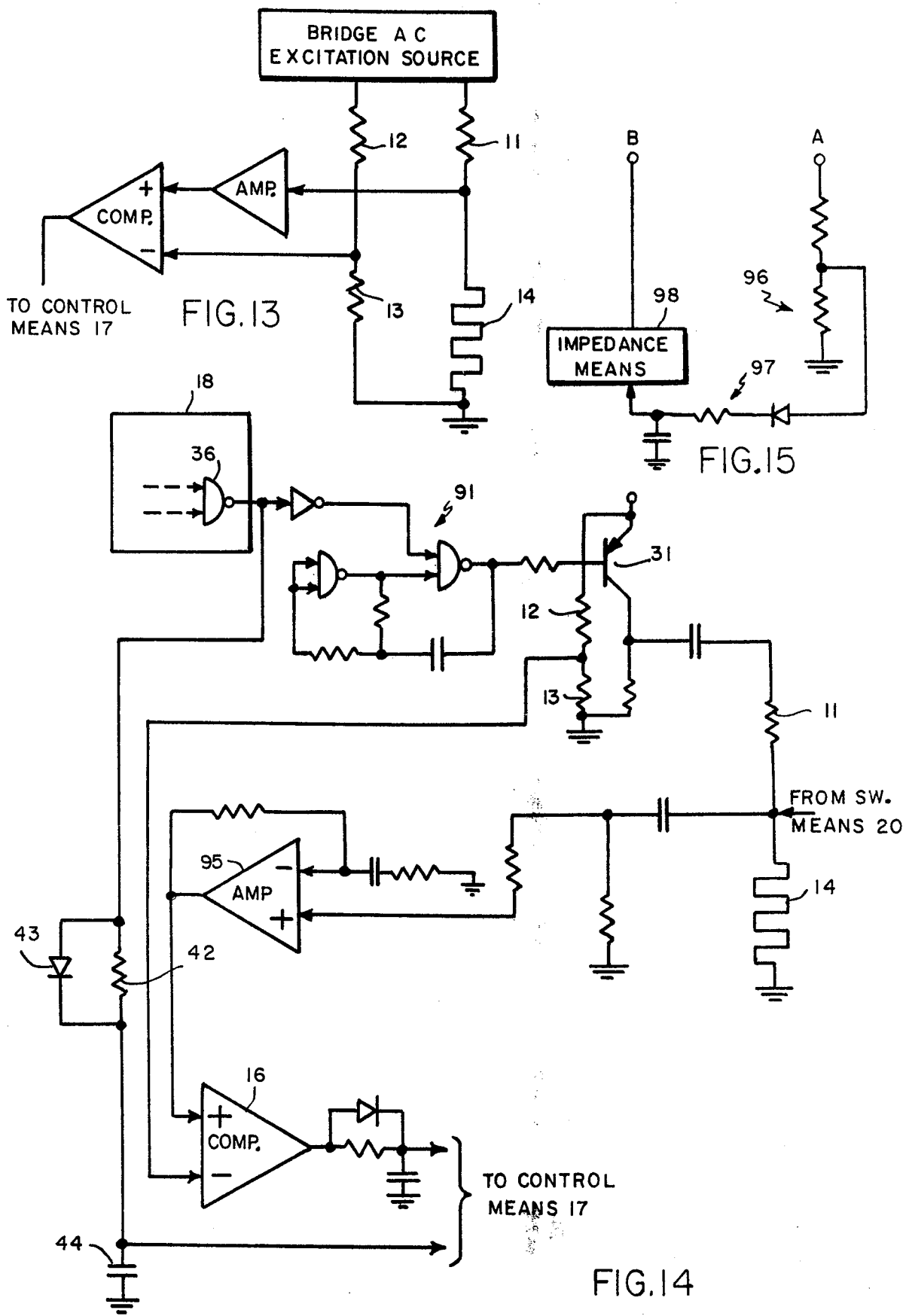

AUTOMATIC HEATER CONTROLLER

INTRODUCTION

This invention relates generally to means for controlling the temperature of a heater and, more particularly, to a control means which senses the resistance of a heater and applies voltage to energize the heater when the resistance differs from a predetermined level.

BACKGROUND OF THE INVENTION

It is desirable in many applications to be able to control as accurately as possible the temperature of a heating device whether used in industrial or laboratory processes, for example. Often such thermal control is exercised by the use of a conventional thermostat which is placed in an appropriate location with respect to the heater, so as to measure the temperature and to provide control of the application of heater voltage, in accordance therewith. Where precision control is required, the construction and operation of the thermostat may be relatively complex and costly, and the use of a single thermostat may be inappropriate where the heating volume is relatively large.

It is desirable to obtain a heater control system which not only is relatively inexpensive, but which provides precise control of the application of the heater voltage in applications where accurate heating is required.

One particular device which has been suggested is found in U.S. Pat. No. 3,524,968, issued on Aug. 18, 1970, to W. J. Walsh. In such a heating device the heating element thereof, which has a predictable positive thermal coefficient of resistivity, is connected in a bridge circuit that is part of a control circuit for energizing the heater element in varying degrees in accordance with changes in the resistivity of the heating element. The use of the heater resistance as the sensing element tends to afford more accurate thermal control than does the use of a temperature sensing thermostat. The Walsh system, however, uses an excitation device which provides a relatively high current, rapidly decaying pulse by the charging and discharging of a capacitor means. Because the sensing element used therein is relatively insensitive to small changes in heater resistance, a high current is required to obtain the desired operation thereof. Moreover, the use of a capacitance charging and discharging device makes the overall control system subject to stray capacitance or inductance which may be present in the heater lines or the controller which causes inaccuracies in the resistance measurements.

It is desirable to provide a more accurate, low power consumption device for achieving the kinds of accuracy required in sensing the heater resistance to produce such thermal control in a manner which is more advantageous and less costly than that disclosed by the Walsh patent.

BRIEF SUMMARY OF THE INVENTION

In accordance with the invention a heater control device is provided which utilizes the change in the resistance of the heater element as the sensed parameter for control. The logic circuitry utilized in the controller is such that in a preferred embodiment thereof the sensing is performed substantially at or near the zero crossings of the power source cycle. Further, the power to the heater element is applied and terminated at the zero crossings. The application of power at the zero crossings eliminates radio frequency interference. A precision comparator amplifier is utilized to compare the voltages from a bridge circuit of which the heater resistance is one element. When the heater resistance is low, and power is required to be supplied to the heater to increase the resistance, as in a resistance which has a positive coefficient of resistivity, pulses are applied to an appropriate switching device, such as a bi-directional thyristor sometimes referred to as a triac element so that the heater resistance increases to its desired level.

In a preferred embodiment of the invention, the controller is arranged to permit only integral cycles of power to be applied to the heater, so that a DC bias is not created on the heater to produce an undesirable DC loading of the power line. Such integral cycle operation is achieved by monitoring not only the zero crossings, but also the slope of the voltage at the zero crossings, so that resistance sensing is achieved on an integral cyclic basis, and the AC power is applied only over one or more integral cycles. In various embodiments of the invention the heater resistance sensing circuitry may use a bridge circuit using DC or AC excitation voltage or it may use a constant current or constant voltage excitation voltage for the heater element.

BRIEF DESCRIPTION OF THE INVENTION

The invention can be described in more detail with the help of the accompanying drawings wherein FIG. 1 discloses a block diagram of one embodiment of the invention;

FIG. 2 discloses a more detailed circuit diagram of the embodiment of FIG. 1;

FIGS. 4 and 15 shows a block diagram of an alternative embodiment of the invention;

FIGS. 13 and 14 show block and circuit diagrams of still another elternative embodiment of the invention.

Figure 1:
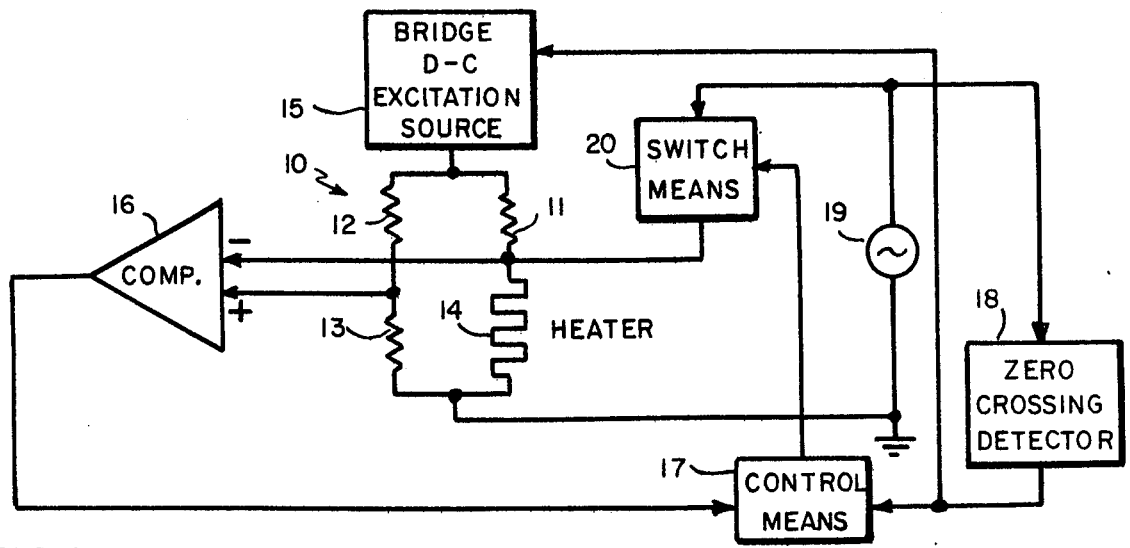

As can be seen in FIG. 1 a bridge circuit 10 comprises resistors 11, 12 and 13 in three legs thereof, and a fourth leg containing resistance 14 which is the heater resistance element of the device whose temperature is to be controlled. During zero crossings of the AC voltage from AC source 19, a DC voltage is used to provide excitation to the bridge from a DC excitation source 15. The output of the bridge is fed to a precision comparator amplifier 16, the common junction between resistances 12 and 13, being supplied to the positive input thereof, and the common junction between resistance 11 and the heater resistance element 14 being supplied to the negative input thereof.

When the heater resistance is below its desired level, the DC voltages sensed at the junction points are such that an output is obtained from the comparator, which is supplied to a control means 17. Control means 17 is also supplied with a signal from a zero crossing detector circuit 18 which provides an output pulse just before the input power voltage from AC power source 19 passes through a zero crossing in either direction, i.e., whenever it passes from a positive to a negative voltage, or vice versa. The sensing of the heater resistance can be effectively arranged so that it occurs only at the zero crossings of the AC power voltage. When the output from comparator 16 indicates that the heater resistance is too low, power must be supplied to the heater from AC power sourse 19. Such power is supplied via an appropriate switch means 20 the operation of which is also controlled to be responsive to the output of zero crossing detector 18 so that a control pulse is supplied to the switch means and AC power is accordingly applied directly to the heater from source 19 only at a zero crossing of the heater AC voltage.

Figure 2:
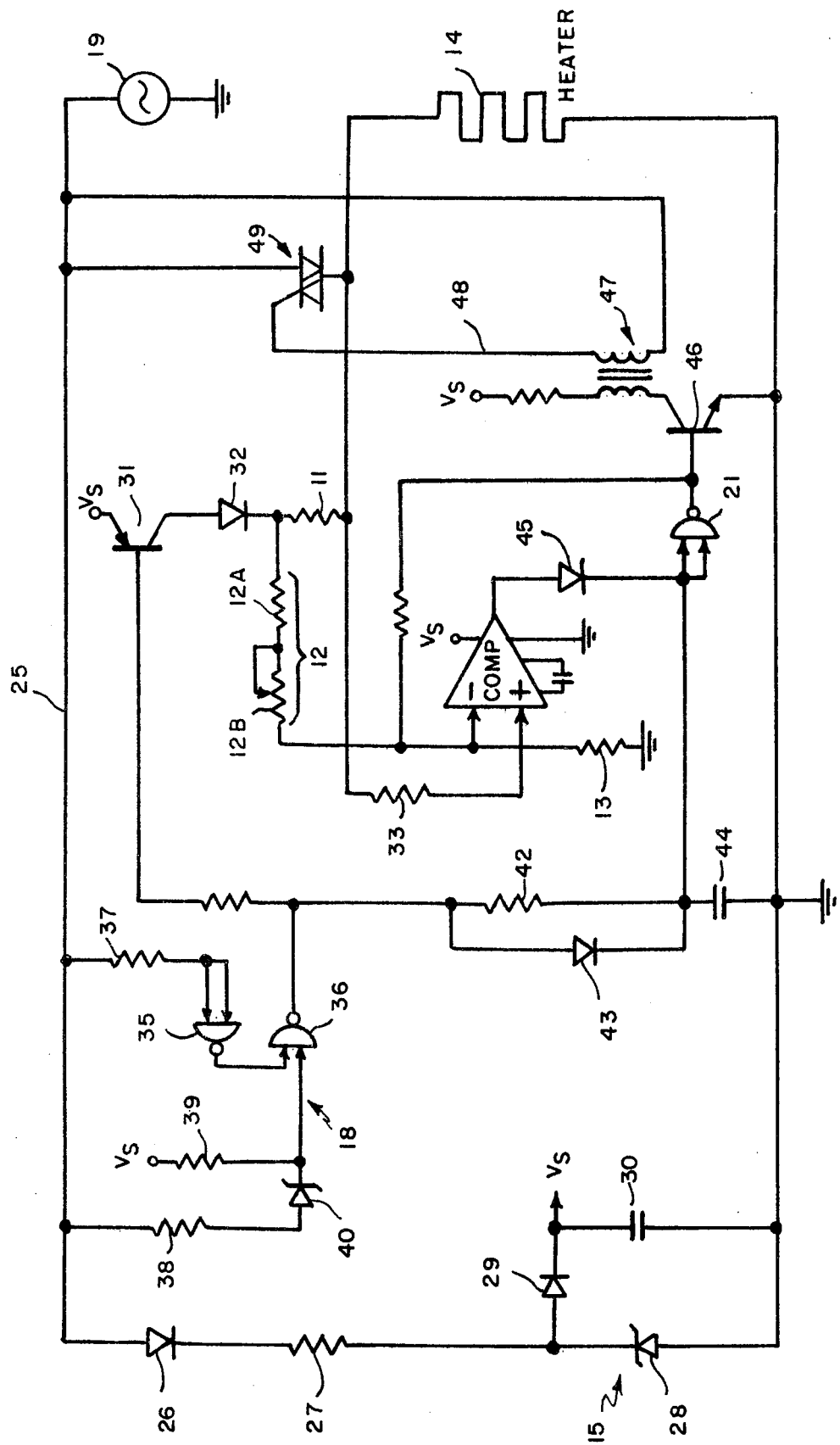

Specific circuitry for providing such operation is shown in FIG. 2 wherein AC power source 19 supplies AC power at line 25. Such power is supplied to the controller logic via rectifier 26 and resistance 27. The DC excitation source 15 comprises a Zener diode 28 which is used to limit the voltage at the anode of rectifier 29, which voltage is supplied to a capacitor 30 from which the DC excitation voltage $V_s$ is obtained. When the AC power is positive, the voltage at diode 29 is limited to a suitable value (e.g., approximately 15 volts) and capacitor 30 is then charged and protected from discharging by diode 29. The capacitance of capacitor 30 is of sufficient size to maintain a reasonably constant voltage $V_s$ during the time when the AC power voltage is negative.

A bridge circuit in FIG. 2 comprises resistances 11, 12 and 13 as well as heater resistance 14. Bridge excitation voltage $V_s$ is supplied thereto via transistor 31 and diode 32. The diode 32 provides protection for transistor 31 when positive line voltage appears across the heater resistance, while the high voltage rating of the transistor can be selected to provide protection from negative line voltage excursions. During excitation of the bridge circuit which, in the embodiment shown, only occurs at a zero crossing via control of the operation of transistor 31 by the output of zero crossing detector 18 at the output of gate 36, the voltage at the junction of the resistance 11 and heater resistance 14 of the bridge circuit is supplied to the positive input of comparator 16 via resistor 33 and the voltage at the junction of resistors 12 and 13 is applied to the negative terminal thereof. In the specific circuitry shown, resistance 12 can be varied and in one embodiment can comprise a fixed resistance 12A and variable resistance 12B as shown.

The zero crossing detector 18 comprises nand gates 35 and 36, the inputs to nand gate 35 being supplied from AC power source 19 via resistor 37 and the output thereof being supplied to one input of nand gate 36, the other input of which is supplied from the circuit comprising resistors 38 and 39, resistor 38 being connected to the AC power line and supplying a voltage to gate 36 via Zener diode 40. Voltage $V_s$ is supplied thereto via resistor 39. Thus, the output of nand gate 36 provides a pulse whenever the AC line voltage passes through zero in either a positive or negative direction. Such voltage is supplied to a switch control means which includes nand gate 21 via input resistance 42, having a diode 43 thereacross, the other end of resistance 42 being connected through a capacitor 44 to ground.

The output of the comparator 16 is also supplied through diode 45 to nand gate 21, the output of such nand gate being supplied via transistor 46 to a pulse transformer 47 which provides a pulse control signal on line 48 to the control terminal of a switch device 49, which in the specific embodiment shown is a bi-directional thyristor element.

Figure 3:
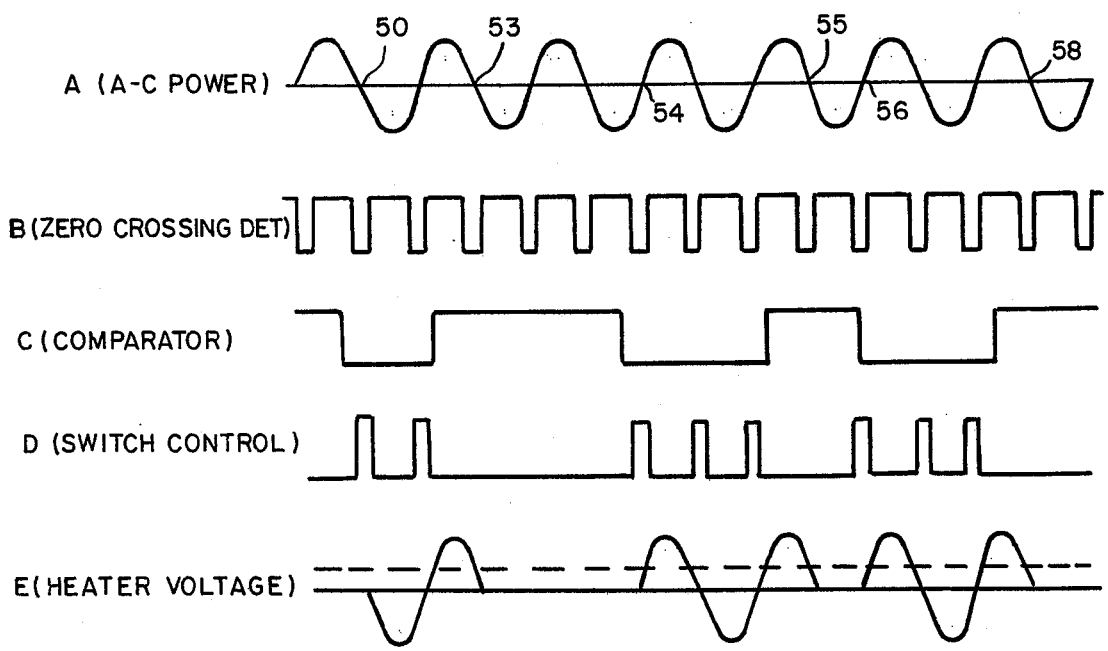
FIG. 3 shows a plurality of wave forms associated with the operation of the circuitry of FIGS. 1 and 2.

FIG. 3 shows the wave form diagrams of the signal at the output of the AC power unit (wave form A); the signal at the output of zero crossing detector 18 (wave form B); the signal at the output of comparator 16 (wave form C); the control signal from nand gate 21 for the triac switching device (wave form D); and the AC signal applied to the heater resistance 14 (wave form E).

Thus, as can be seen in FIG. 3, at every zero crossing of the AC power signal the zero crossing detector 18 produces an output pulse such that the output thereof goes low for a predetermined time period. When the comparator output goes low to indicate that AC power should be applied through the resistance (i.e., the heater resistance 14 is too low) the coincidental low outputs from the zero crossing detector and the comparator cause the control signal for switch 49 to be applied to such switching device to turn the switching device on. The latter device is such that it will remain on for a half cycle and will automatically shut off unless the control signal remains applied thereto. Thus, as can be seen in the exemplary wave forms of FIG. 3, at the zero crossing 50 in wave form A, both the zero crossing detector and comparator outputs are such as to provide a control signal for switching device 19 which turns on the triac switch so that AC power is applied to the heater resistance 14. At the end of a half cycle (i.e., at the next zero crossing) both the zero crossing detector and comparator output are still such as to require the switch control signal to remain on, so that AC power continues to be supplied to heater resistance 14. At the next zero crossing 53, the comparator output is such as to indicate that no further AC power is required to be supplied to heater resistance 14 and no switch control signal is applied to switching device 49 and the AC power is automatically removed from heater resistance 14 at that point. Similarly, AC power is applied for one and a half cycles from zero crossing 54 to zero crossing 55 and for another one and a half cycles from zero crossing 56 to zero crossing 58.

In utilizing the approach shown in FIGS. 1–3, the AC power which is applied to the heater resistance may, over an extended time period, produce a DC bias thereon, as shown in FIG. 3, wherein AC power is applied more on the positive half cycles than on the negative half cycles so that a positive DC bias is, in effect, placed on the heater resistance.

The presence of such a bias may tend to heat up the power transformer and it is desirable that such bias be avoided in some applications. In order to do so, it is helpful in some applications to modify the scheme of the invention in order to assure that the AC power is always applied for integral cycles thereof. Such a scheme is shown with reference to FIGS. 4–6. As can be seen in the block diagram of FIG. 4, substantially the same bridge circuit and bridge excitation source, as well as comparator and switching means, are utilized as in FIG. 1. However, the control of the switching means differs so that, when power is required to be supplied from AC power source 19 to heater resistance 14, the switching means always operates to provide an integral number of such cycles.

In accordance therewith not only is the zero crossing point of the AC power voltage detected by a zero crossing detector, but the slope thereof is also detected. Such slope may be detected either as the positive slope or the negative slope and, in the particular embodiment discussed with reference to FIG. 4, a negative slope detector 60 is utilized. Accordingly, when the zero crossing detector and the negative slope detector indicate that the AC power voltage is passing through zero at a negative slope and when the comparator indicates that AC power should be applied to the heater, the switch means 20 is activated via a control means 17 to supply AC power therethrough to the heater resistance 14. The switch means must then be turned off, or deactivated, at the end of one or more integral cycles of the AC voltage to remove the application of the AC power to the heater. Such action is effected by supplying a signal which sets the activation of switch 20 when the zero crossing detector, the negative slope detector, and the comparator indicate that AC power should be supplied to the heater resistance. When the AC power then subsequently goes positive, such positive excursion is detected by a positive voltage detector 64 to provide a reset signal for control means 17 to de-activate the switch 20 at the end of the positive half cycle.

Thus, if at the beginning of a cycle (e.g., when the AC power crosses zero to begin its negative excursion) power is required for the heater voltage, the control means 17 is set so as to provide a signal for activating the switch means 20, power thereby being applied from AC source 19 to the heater resistance 14. When the AC power next crosses zero and enters its positive excursion, the positive voltage detector resets the control means 17 which thereupon shuts off the switch means (at the end of an integral cycle). Since the AC power is applied by the system of FIG. 4 only in integral numbers of cycles, there is no DC bias which is created and the undesirability of transformer heating is avoided.

Figure 4:
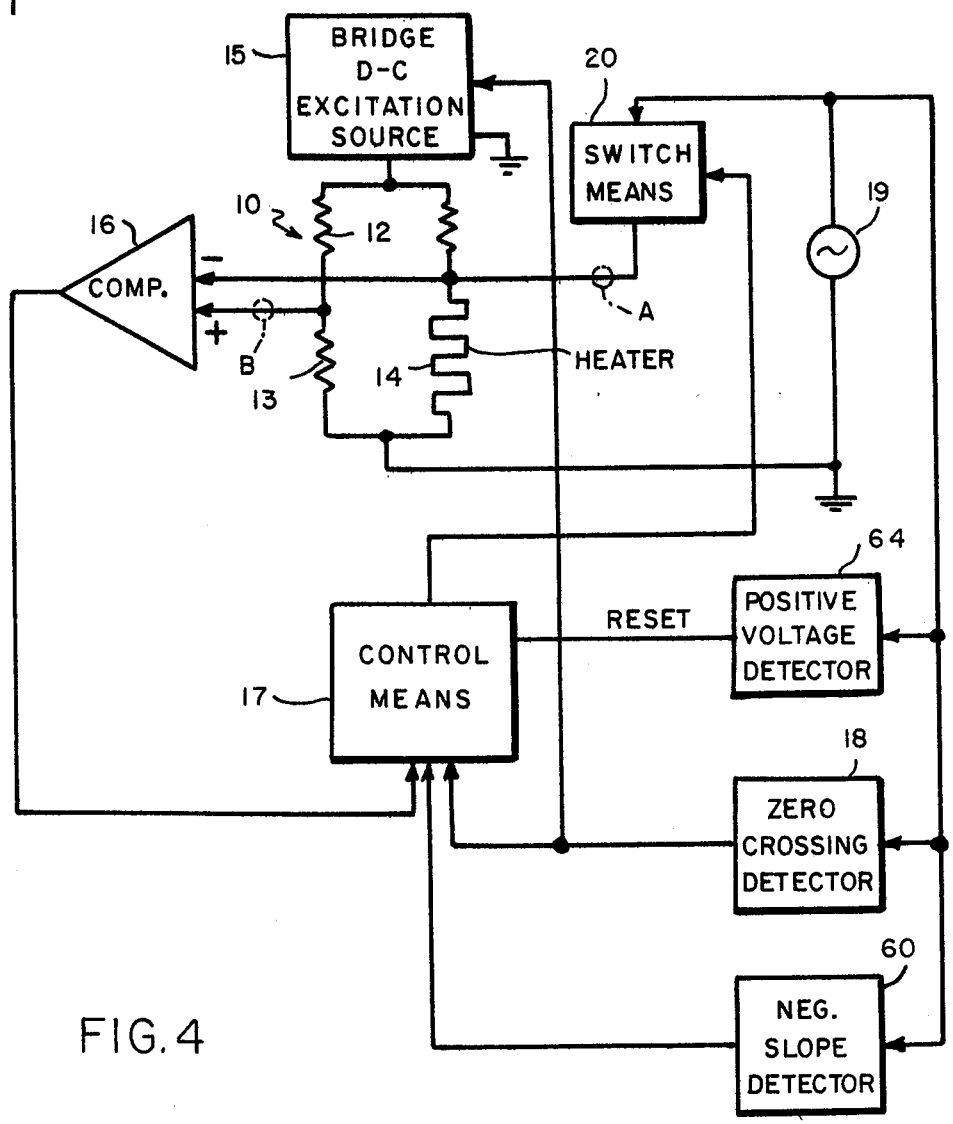
Figure 5:
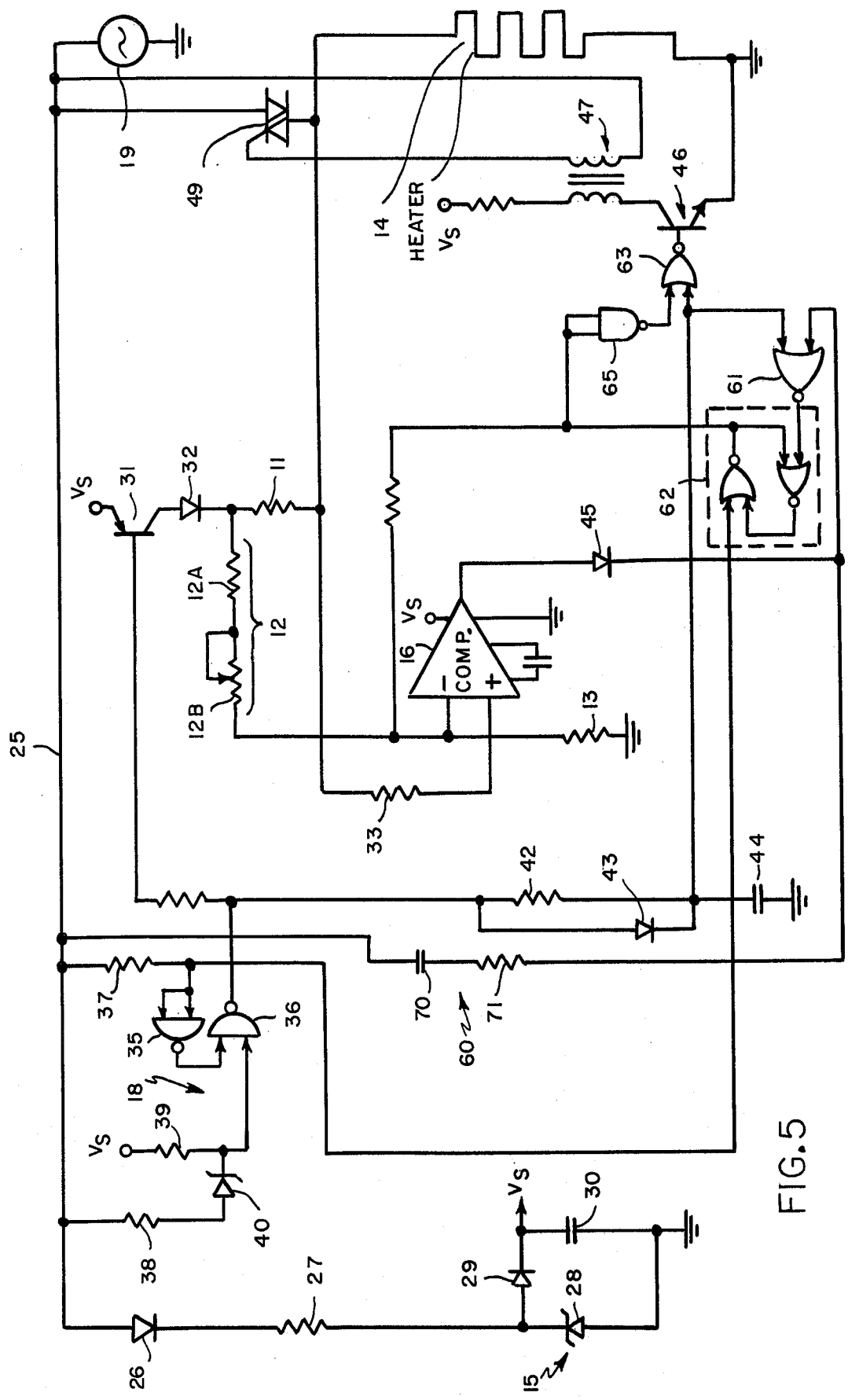
FIG. 5 shows a more detailed circuit diagram of the embodiment of FIG. 4.

FIG. 5 shows a particular circuit embodiment for implementing the configuration of FIG. 4. As seen therein, the excitation source 15 for providing voltage $V_s$ is substantially similar to that shown in FIG. 3 and the zero crossing detector 18 is substantially the same as shown therein. A capacitor 70 and resistor 71 are connected in a series from the AC power line 25 to form a slope detector 60, the output thereof being available at the lower end of resistor 71. The output of the zero crossing detector 18 and the output of the comparator 16, as well as the output of slope detector 60 are supplied to a nor gate 61 to produce a "Set" pulse for a flip-flop circuit 62. A "Reset" pulse is supplied from resistor 37 which effectively monitors the polarity of the AC power voltage. The output of flip-flop 62 is supplied to a nor gate 63 through an inverter 65 together with the output of zero crossing detector 18, for supplying a pulse to transistor 46 and thence to pulse transformer 47 to produce the control signal for switch means 49.

Figure 6:
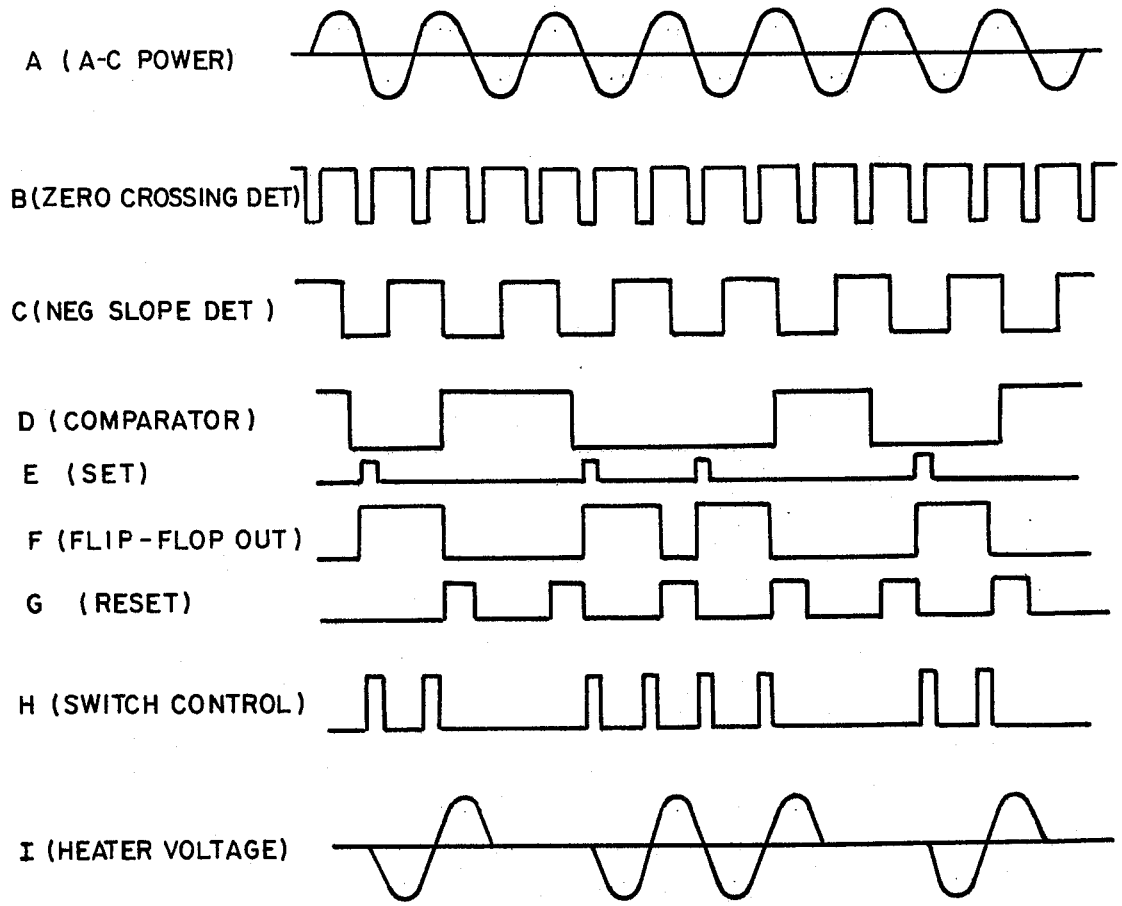
FIG. 6 shows a plurality of wave forms associated with the embodiment of FIGS. 4 and 5.

The operation of the circuit of FIG. 5 can be better understood with the help of the wave forms shown in FIG. 6. As seen therein, at each zero crossing of the AC power voltage (wave form A) the zero crossing detector produces an output pulse (wave form B). The negative slope detector produces an output pulse (wave form C) only when the AC power voltage enters its negative excursion, i.e., the AC power voltage has a negative slope. If the comparator output (wave form D) indicates that AC power should be applied to the heater resistor at the time the zero crossing detector and negative slope detector indicate that the AC power voltage is passing through zero in the negative direction, a set pulse (wave form E) is produced at nor gate 61 to actuate the flip-flop circuit 62 and to produce an output therefrom (wave form F). Accordingly, a switch control signal (wave form H) is applied to switch means 49 via transistor 46 and transformer 47 from nor gate 63 so that AC power (wave form I) is supplied to the heater. When the AC power enters its positive excursion at some point after the zero crossing, a reset pulse (wave form G) is supplied to the flip-flop circuit 62 so as to reset the flip-flop. The resetting thereof de-activates the switching means 49 at the end of the next half cycle so that an integral cycle of power is supplied to the heater resistor.

If at the end of such integral cycle the comparator indicates that additional power must still be supplied to the heater resistance, the flip-flop is immediately set again so that power can continue to be supplied through another one, or more, integral cycles until the comparator no longer indicates that power is necessary, in which case the reset pulse from positive voltage detector 64 always resets the flip-flop during the positive half cycle. Thus, in accordance with the configuration of FIGS. 4 and 5, only integral cycles of AC power are supplied to the heater resistance.

Figure 7:
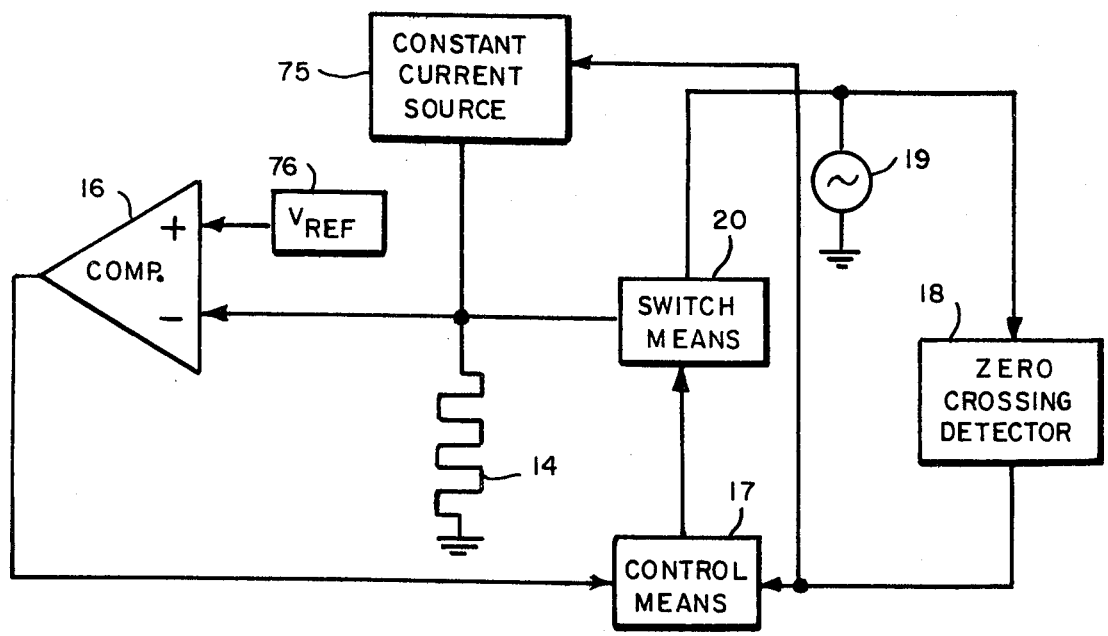
FIGS. 7 and 8 show block and circuit diagrams of another alternative embodiment of the invention.
Figure 8:
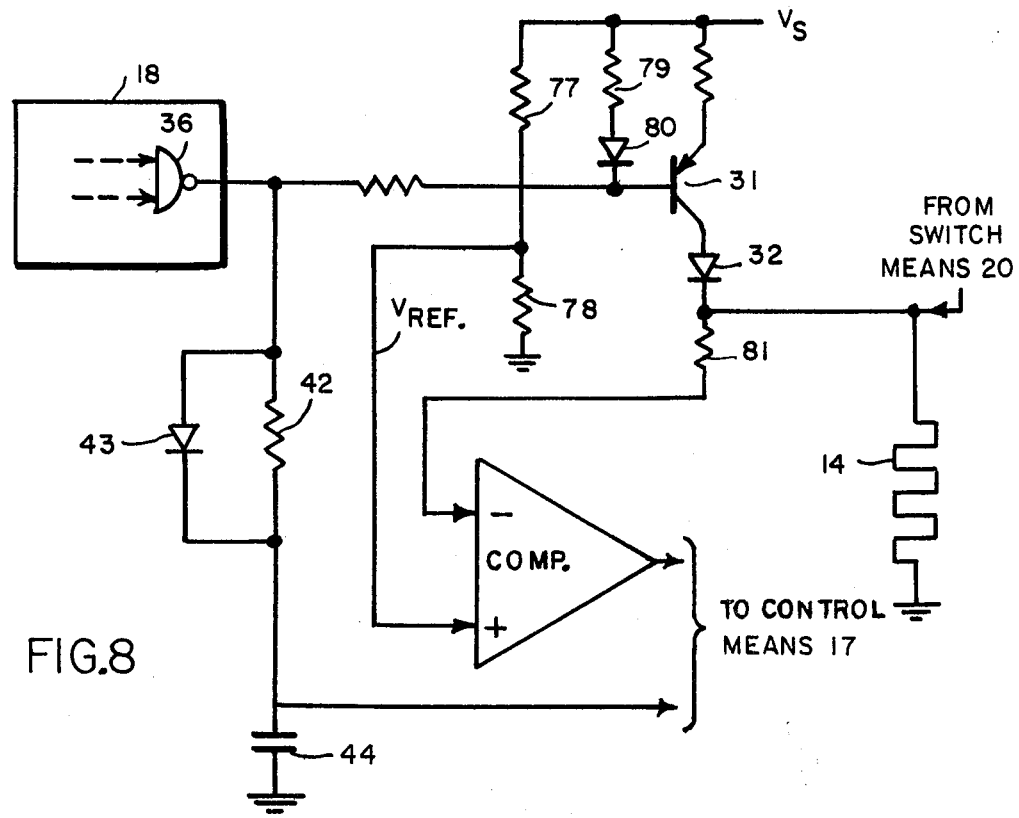

Further alternative embodiments of the invention are shown in FIGS. 7–14 in which the principle of applying and terminating heater voltage at the zero crossings is utilized. As can be seen in FIGS. 7 and 8, for example, a constant current source 75 supplies a constant current through heater resistance 14, the voltage thereacross being supplied to the negative input of comparator 16. A fixed reference voltage from a suitable reference source 76 is supplied to the positive input of comparator 16. The application of the power supply voltage to heater 14 is thereupon controlled, as previously shown in FIG. 1, for example, where the comparator output is fed to control means 17 which is also supplied with the output from zero crossing detector 18. Control means 17 controls the activation of switch means 20, as before. The constant current source approach can also be used with the control system configuration shown in FIG. 4 to provide integral cycle application of heater voltage, as described in connection therewith. In either case the control circuitry can be as shown in FIGS. 2 and 5.

One embodiment of the specific circuitry of constant current source 75 and reference voltage source 76 is shown in FIG. 8 wherein the voltage $V_s$ (generated as discussed above in FIGS. 2 and 5) is supplied to a voltage divider comprising resistors 77 and 78 to provide $V_{ref}$ at the negative input of comparator 16. The parallel circuit branch comprising resistor 79 and diode 80 supplies a voltage at the base of transistor 31 which causes a constant current to flow in heater resistance 14, the voltage thereacross being supplied through input resistor 81 to the positive input of comparator 16. The remainder of the circuitry can be as shown in FIGS. 2 or 5 and the heater voltage control circuitry operates accordingly.

Figure 9:
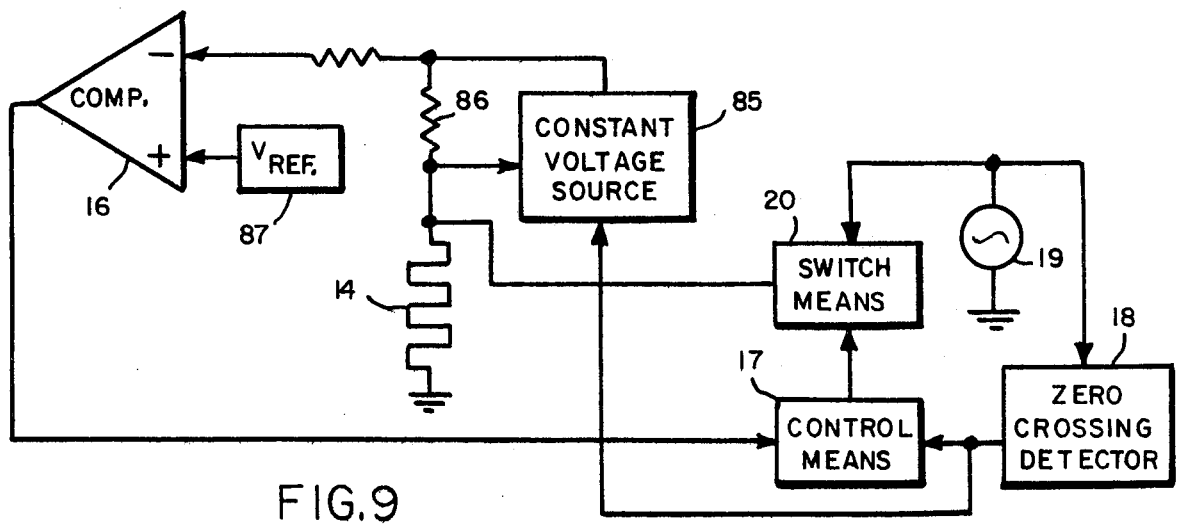
FIGS. 9 and 10 show block and circuit diagrams of still another alternative embodiment of the invention.

Alternatively, as shown in FIG. 9, the system may be set up to utilize a constant voltage source 85 to supply heater resistor 14. A current sensing resistor 86 senses the voltage in series with heater resistor 14 by sensing current through the heater and provides a feedback voltage which maintains the voltage at the heater constant. The voltage across the combination of sensing resistor and heater resistor is compared with an appropriate reference voltage 87 at comparator 16. The remainder of the control circuitry is as shown in FIGS. 1 and 2 or in FIGS. 4 and 5 as discussed above. A suitable specific configuration for the circuitry of the constant voltage source is shown in FIG. 10.

Figure 10:
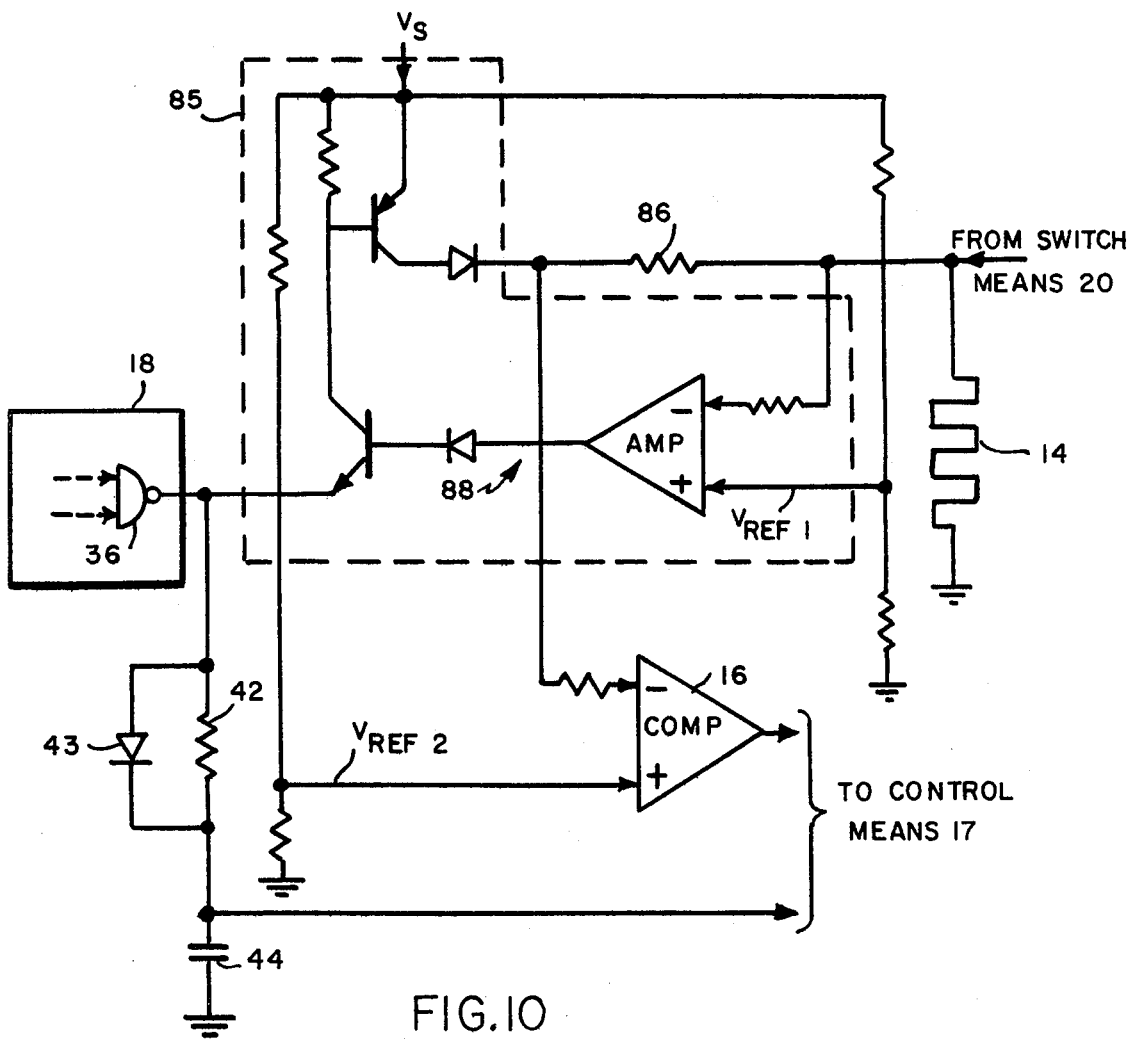

As seen in FIG. 10 the voltage at heater resistor 14 is maintained substantially constant by feedback path 88 which compares the voltage thereat with a reference voltage $V_{ref1}$, the constant voltage being determined by the current which it is desired to pass through the heater resistor, e.g., 50 milliamperes. The voltage across sensing resistor 86 and heater resistor 14 is then compared with reference voltage $V_{ref2}$ at comparator 16 for supplying to the control means 17 in the same manner as specifically shown, for example, with reference to the comparator outputs in FIGS. 2 and 5.

Figure 11:
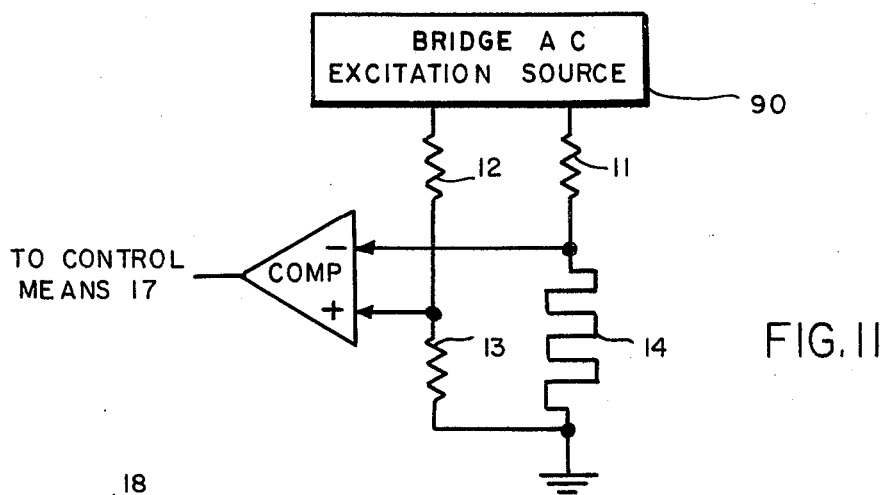
FIGS. 11 and 12 show block and circuit diagrams of still another alternative embodiment of the invention.
Figure 12:
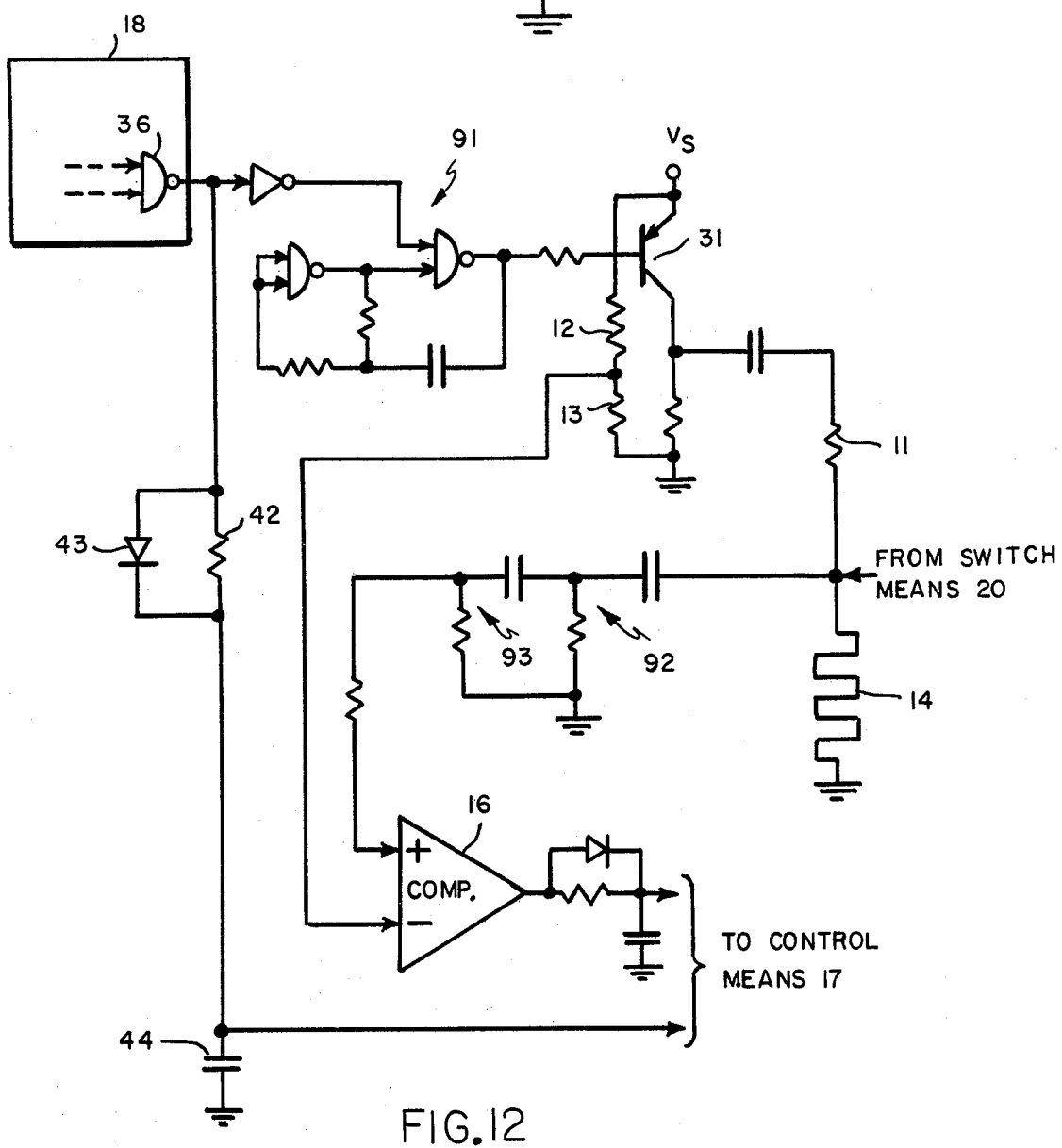

A further alternative embodiment of the invention is shown in FIGS. 11 and 12 which utilizes bridge circuitry excited from an AC excitation source 90 rather than a DC excitation source. The AC excitation source includes a high frequency oscillator 91 which may have a frequency, for example, of about 100 kHz., the output of transistor 31 supplying the AC excitation voltage to the bridge resistors 11, 12, 13 and 14, as shown. The voltage at the heater resistor 14 is supplied to comparator 16 via R-C filter networks 92 and 93 for comparison with the voltages at the junction of resistors 12 and 13.

The use of AC bridge excitation eliminates problems which may arise due to drifts which may occur in the DC systems discussed above.

The AC system of FIGS. 11 and 12 may be further improved in its sensitivity, if the monitored voltage at the heater resistor 14 is amplified before comparison with the voltage at the junction of resistors 12 and 13 as shown in FIGS. 13 and 14 which are substantially the same as the configurations of FIGS. 11 and 12 with the inclusion of amplifier circuitry 95.

Although in all of the circuitry shown above it is preferable to sense the heater resistance only at the zero crossings of the AC power voltage, it is possible that in some applications the heater resistance can be sensed continuously, although in all instances in accordance with the invention the AC heater voltage should be applied and terminated only at or near zero crossings of the AC power voltage to eliminate RFI and rapid changes in voltage and current.

When using the system of the invention for the heating of a point, or region, which is relatively remote from the heater resistance element itself, a thermal impedance is effectively present between the heater element and the remote region which it is desired to heat. A temperature differential thereby exists from the heater to such region. As such temperature differential gets larger, a greater temperature is required at the heater than would be the case if the heater element were to be used only to heat the region in the immediate vicinity of the heater element. In order to assure that the heater element temperature is raised sufficiently to heat not only its immediate vicinity but also a desired region remote therefrom, the system can be suitably modified.

One embodiment of such a modification is disclosed with reference to FIGS. 4 and 15. In such embodiment a positive feedback loop is effectively placed around the bridge circuit from point A to point B in FIG. 4. Such loop is shown in more detail in FIG. 15, the design thereof being most effectively used with the system of the invention which applies integral cycles of the AC power to the heater element.

As seen in FIG. 15, a voltage proportional to the voltage across heater element 14 is provided by a voltage divider network 96. Such voltage is appropriately rectified and filtered by rectifier/filter network 97 and supplied to point B via an appropriate impedance means 98 to increase the voltage at the comparator positive input, such feedback voltage effectively being added to the voltage at the junction of resistances 12 and 13 of the bridge circuit. The increased voltage effectively causes greater AC power to be applied to the heater element 14 than would normally be the case without the presence of the feedback loop, so that a region remote from the heater element can be heated to the desired temperature. The impedance means 98 may in the simplest case be resistance, although in some applications it can be a complex impedance, if desired.

What is claimed is:

1. A system for controlling the temperature of a heater apparatus having a heater element therein, the electrical resistance of said heater element determining the temperature of said apparatus, said system comprising means for providing a heater voltage for said heater element;

means responsive to said heater voltage for detecting zero crossings thereof;

means responsive to said zero crossing detecting means for providing sensing excitation voltage at or near said zero crossings;

circuit means including said heater element and responsive to said sensing excitation voltage for sensing the excitation voltage at said heater element and for providing a reference voltage;

means for comparing said excitation voltage at said heater element and said reference voltage for producing an output representing the polarity of the difference therebetween; and control means responsive to said zero-crossing detecting means and to the output from said comparing means for controlling the application of said heater voltage to said heater element at or near said zero crossings.

2. A system in accordance with claim 1 wherein
   said circuit means is a bridge circuit and includes said heater element in one leg thereof; and
   said control means includes
      switch means for controlling the application of said heater voltage to said heater element; and
      control logic circuity responsive to said zero-crossing detecting means and to the output from said comparing means for controlling the activation of said switch means.

3. A system in accordance with claim 2 wherein said sensing excitation voltage is a DC voltage.

4. A system in accordance with claim 3 wherein said control logic circuitry includes
   gate means responsive to said zero-crossing detecting means and to the output from said comparing means for providing a control signal for controlling the activation of said switch element.

5. A system in accordance with claim 4 wherein said switch means includes a bi-directional thyristor switching element.

6. A system in accordance with claim 2 wherein said sensing excitation voltage is an AC voltage.

7. A system in accordance with claim 6 wherein said control logic circuitry includes
   gate means responsive to said zero-crossing detecting means and to the output from said comparing means for providing a control signal for controlling the activation of said switch element.

8. A system in accordance with claim 7 wherein said switch means includes a bi-directional thyristor switching element.

9. A system in accordance with claim 8 wherein said circuit means includes means for amplifying said AC excitation voltage sensed at said heater element, said comparing means comparing said amplified excitation voltage at said heater element with said reference voltage.

10. A system in accordance with claim 1 and further including
means responsive to said heater voltage for detecting a selected polarity thereof;
means responsive to said heater voltage for detecting the slope thereof; and
said control means is further responsive to said heater voltage slope detecting means and to said heater voltage polarity detecting means for controlling the application of said heater voltage to said heater element for an integral number of cycles thereof.

11. A system in accordance with claim 10 wherein said circuit means is a bridge circuit and includes said heater element in one leg thereof; and
said control means includes
a switch means for controlling the application of said heater voltage to said heater element; and
control logic circuitry responsive to the output from said comparing means, to said zero-crossing detector means, to said negative slope detecting means, and to said polarity voltage detecting means for producing a control signal for controlling the activation of said switch means.

12. A system in accordance with claim 7 wherein said sensing excitation voltage is a DC voltage.

13. A system in accordance with claim 11 wherein said control logic circuitry includes
a flip-flop circuit;
gating means responsive to said zero-crossing detecting means, to said negative slope detecting means, and to the output from said comparing means for providing a signal for setting said flip-flop circuit;
said polarity voltage detecting means providing a signal for resetting said flip-flop circuit; and
gate means responsive to said flip-flop circuit and to said zero-crossing detecting means for providing the control signal for said switch means.

14. A system in accordance with claim 13 wherein said switch means is a bi-directional thyristor switching element.

15. A system in accordance with claim 11 wherein said sensing excitation voltage is an AC voltage.

16. A system in accordance with claim 15 wherein said control logic circuitry includes
a flip-flop circuit;
gating means responsive to said zero-crossing detecting means, to said negative slope detecting means, and to the output from said comparing means for providing a signal for setting said flip-flop circuit;
said polarity voltage detecting means providing a signal for resetting said flip-flop circuit; and
gate means responsive to said flip-flop circuit and to said zero-crossing detecting means for providing the control signal for said switch means.

17. A system in accordance with claim 16 wherein said switch means is a bi-directional thyristor switching element.

18. A system in accordance with claim 17 wherein said circuit means includes means for amplifying said AC excitation voltage sensed at said heater element, said comparing means comparing said amplified excitation voltage at said heater element with said reference voltage.

19. A system in accordance with claim 1 wherein said circuit means includes
means for supplying a substantially constant excitation current to said heater element;
means for sensing the excitation voltage at said heater element produced by said constant current; and
means for providing a reference voltage, said comparing means comparing said excitation voltage and said reference voltage for producing an output representing the polarity of the difference therebetween.

20. A system in accordance with claim 19 and further including
means responsive to said heater voltage for detecting a selected polarity thereof;
means responsive to said heater voltage for detecting the slope thereof; and
said control means is further responsive to said heater voltage slope detecting means and to said heater voltage polarity detecting means for controlling the application of said heater voltage to said heater element for an integral number of cycles thereof.

21. A system in accordance with claim 1 wherein said circuit means includes
means for supplying a substantially constant excitation voltage at said heater element;
means for sensing the excitation current of said heater element; and
means for providing a reference voltage, said comparing means comparing said excitation current and said reference voltage for producing an output representing the polarity of the difference therebetween.

22. A system in accordance with claim 21 wherein said constant voltage supplying means includes feedback circuitry for maintaining said excitation voltage substantially constant.

23. A system in accordance with claim 22 and further including
means responsive to said heater voltage for detecting a selected polarity thereof;
means responsive to said heater voltage for detecting the slope thereof; and
said control means is further responsive to said heater voltage slope detecting means and to said heater voltage polarity detecting means for controlling the application of said heater voltage to said heater element for an integral number of cycles thereof.

24. A system in accordance with claim 1 for use in heating a region remote from said heater element, said system further including means for providing a further control of the application of said heater voltage to said heater element to increase the temperature thereof to a sufficient level to heat said remote region.

25. A system in accordance with claim 24 wherein said circuit means includes a positive feedback loop for increasing said reference voltage by an amount proportional to the voltage as said heater element.

26. A system in accordance with claim 11 wherein said circuit means further includes a positive feedback loop connected from said heater element to said comparing means for increasing said reference voltage by an amount proportional to the voltage at said heater element.

27. A system in accordance with claim 26 wherein said positive feedback loop includes voltage divider means connected to said heater element for providing a voltage proportional to the voltage at said heater element;

means for rectifying and filtering said proportional voltage; and impedance means for supplying said rectified and filtered voltage to said comparing means.

28. A system in accordance with claim 27 wherein said impedance means is a resistance means.

* * * * *